US012764472B2

(12) United States Patent
Holt et al.

(10) Patent No.: US 12,764,472 B2
(45) Date of Patent: Oct. 13, 2026

(54) DIAPHRAGM ASSEMBLY, METHOD OF MANUFACTURING DIAPHRAGM ASSEMBLY AND INJECTION MOLD

(71) Applicant: Tymphany HK Limited, Hong Kong (HK)

(72) Inventors: Andrew Trippier Holt, Taipei City (TW); Wen-Hong Wang, Taipei City (TW); Chia-Chien Chen, Taipei City (TW); Yi-Hui Hsiao, Taipei City (TW)

(73) Assignee: TYMPHANY HK LIMITED, Hong Kong (HK)

( * ) Notice: Subject to any disclaimer, the term of this patent is extended or adjusted under 35 U.S.C. 154(b) by 196 days.

(21) Appl. No.: 18/400,176

(22) Filed: Dec. 29, 2023

(65) Prior Publication Data

US 2024/0217148 A1 Jul. 4, 2024

Related U.S. Application Data

(60) Provisional application No. 63/436,210, filed on Dec. 30, 2022.

(51) Int. Cl.

| | |
|---|---|
| ***H04R 9/04*** | (2006.01) |
| ***B29C 45/14*** | (2006.01) |
| ***B29L 31/34*** | (2006.01) |
| ***H04R 9/06*** | (2006.01) |

(52) U.S. Cl.
CPC ....... *H04R 9/045* (2013.01); *B29C 45/14065* (2013.01); *B29C 2045/14131* (2013.01); *B29L 2031/3418* (2013.01); *H04R 9/06* (2013.01); *H04R 2209/024* (2013.01); *H04R 2400/11* (2013.01)

(58) Field of Classification Search
CPC .............. B29C 45/14; B29C 45/14065; B29C 2045/14131; B29C 2045/14122; B29L 31/34; B29L 2031/3418; H04R 7/04
See application file for complete search history.

(56) References Cited

U.S. PATENT DOCUMENTS

| | | | | |
|---|---|---|---|---|
| 9,107,002 | B2 * | 8/2015 | Fujitani | H04R 7/127 |
| 2017/0264983 | A1 * | 9/2017 | Worrell | H04R 1/025 |
| 2018/0270569 | A1 * | 9/2018 | Boyd | H04R 7/20 |
| 2020/0001509 | A1 * | 1/2020 | Cen | B29C 45/14377 |

* cited by examiner

*Primary Examiner* — Emmanuel S Luk
*Assistant Examiner* — Shibin Liang
(74) *Attorney, Agent, or Firm* — MUNCY, GEISSLER, OLDS & LOWE, P.C.

(57) ABSTRACT

The present invention provides a diaphragm assembly, a method of manufacturing diaphragm assembly and an injection mold. The method of manufacturing diaphragm assembly includes: providing a cone with at least one alignment feature at a peripheral edge thereof; providing a mounting tool comprising at least one cooperating fixing element, wherein the at least one alignment feature is aligned with the at least one cooperating fixing element respectively; and forming a surround at the peripheral edge of the cone.

11 Claims, 11 Drawing Sheets

DIAPHRAGM ASSEMBLY, METHOD OF MANUFACTURING DIAPHRAGM ASSEMBLY AND INJECTION MOLD

CROSS-REFERENCE TO RELATED APPLICATIONS

This application claims priority of U.S. Provisional Application No. 63/436,210 filed on Dec. 30, 2022 under 35 USC § 119(e), the entire contents of which are hereby incorporated by reference.

BACKGROUND

Technical Field

The disclosure relates to loudspeakers, and specifically to diaphragm assembly, method of manufacturing diaphragm assembly and injection mold.

Related Art

A speaker, often referred to as a loudspeaker, is an audio transducer used to convert electrical signals into sound. The sound production principle of a speaker is the inputting of a signal into a voice coil to generate a magnetic field and then generating back and forth piston motion in a magnetic gap by mutual attraction and repulsion of the voice coil between magnetic poles, so that a diaphragm attached to the voice coil vibrates along with the back-and-forth piston motion of the voice coil and presses air to resonate and vibrate such that sound waves are created. The diaphragm commonly comprises a cone, and may additionally have a separate dome or dustcap or alternative typically annular membrane structures.

Speakers are present in a large number of consumer electronics products. Many popular devices, in particular portable devices, require speakers having a relatively small form factor. Ensuring that such devices are manufactured with the requisite sound quality is a particular challenge, especially for smaller devices.

One challenge in the manufacture of speakers is to ensure the components are properly aligned during assembly. In particular, attachment of the soft surround to the diaphragm cone in the correct position is critical for ensuring a controlled response and high-quality acoustic output. Any misalignment of the diaphragm cone with respect to the surround can be detrimental to the speaker performance. However, accurate placement becomes more challenging with reducing component size.

SUMMARY

All examples and features mentioned below can be combined in any technically possible way. The present invention provides diaphragm assembly, a method of manufacturing diaphragm assembly and an injection mold for a better alignment during assembly.

In one aspect, the method of manufacturing diaphragm assembly includes: providing a cone with at least one alignment feature at a peripheral edge thereof; providing a mounting tool comprising at least one cooperating fixing element, wherein the at least one alignment feature is aligned with the at least one cooperating fixing element respectively; and forming a surround at the peripheral edge of the cone.

Preferably, the cone comprises a dome, but could include additional membrane components e.g. dome or dustcap and related parts.

In an embodiment, the at least one alignment feature is at least one notch. Preferably, the at least one notch is approximately in the shape of triangular, square, or circular.

In an embodiment, there are three alignment features and three cooperating fixing elements, and the three alignment features and the three cooperating fixing elements are located correspondingly.

Preferably, the cone is formed by a thermoforming process or an injection molding process.

In one embodiment, when the cone is formed by the thermoforming process, the method further comprises a cropping process to form the at least one alignment feature. In another embodiment, when the cone is formed by the injection molding process, the at least one alignment feature may be formed at the same time as the injection or after the injection.

Preferably, the mounting tool is a part of an injection molding mold, and the surround is formed by an overmoulding process or a liquid silicone rubber (LSR) injection process.

Preferably, the material of cone may be polycarbonate (PC) or other plastic polymer or blend, thermoplastic elastomer, thermosetting or single/two-component silicone, glass fiber (GF) or any combination thereof, and the material of surround may be thermoplastic elastomer, thermosetting or single/two-component silicone or any combination thereof.

In one aspect, the present invention provides a diaphragm assembly, comprising: a cone with at least one alignment feature at a peripheral edge thereof, wherein the at least one alignment feature is used to be aligned respectively to at least one of cooperating fixing element of a mounting tool.

In an embodiment, the diaphragm assembly further comprises a surround. The surround surrounds the peripheral edge of the cone, and the surround comprises at least one recessed portion surrounded by the at least one alignment feature respectively. Preferably, in another embodiment, the surround comprises at least one protruding portion configured to correspond to the at least one alignment feature.

Preferably, the at least one alignment feature is at least one notch.

In yet another aspect, the present invention provides an injection mold, comprising: a chamber; and at least one cooperating fixing element located within the chamber. The at least one cooperating fixing element is used for a cone with at least one alignment feature to be aligned therewith, and the at least one alignment feature is at peripheral edge of the cone. The cone is located at the center of the chamber after the alignment, and the cone is coaxial with the chamber. The chamber is filled full of injection material to form a surround surrounding the peripheral edge of the cone.

Preferably, the at least one cooperating fixing element is at least one triangular bar, at least one square bar, or at least one circular bar but chiefly functions as a locator for the cone assembly, and the shape can be various.

Preferably, the surround is formed by an overmoulding process or a liquid silicone rubber (LSR) injection process.

BRIEF DESCRIPTION OF THE DRAWINGS

The present disclosure will become more fully understood from the detailed description given herein below for illustration only, and thus not limitative of the present invention, wherein:

FIGS. 6A-6D are perspective views of the diaphragm assembly in accordance with yet another embodiment of the present disclosure, wherein FIGS. 6B-6D show partial enlarged views;

FIGS. 7A-7D are perspective views of the diaphragm assembly in accordance with yet another embodiment of the present disclosure, wherein FIGS. 7B-7D show partial enlarged views.

DETAILED DESCRIPTION

Figure 1:
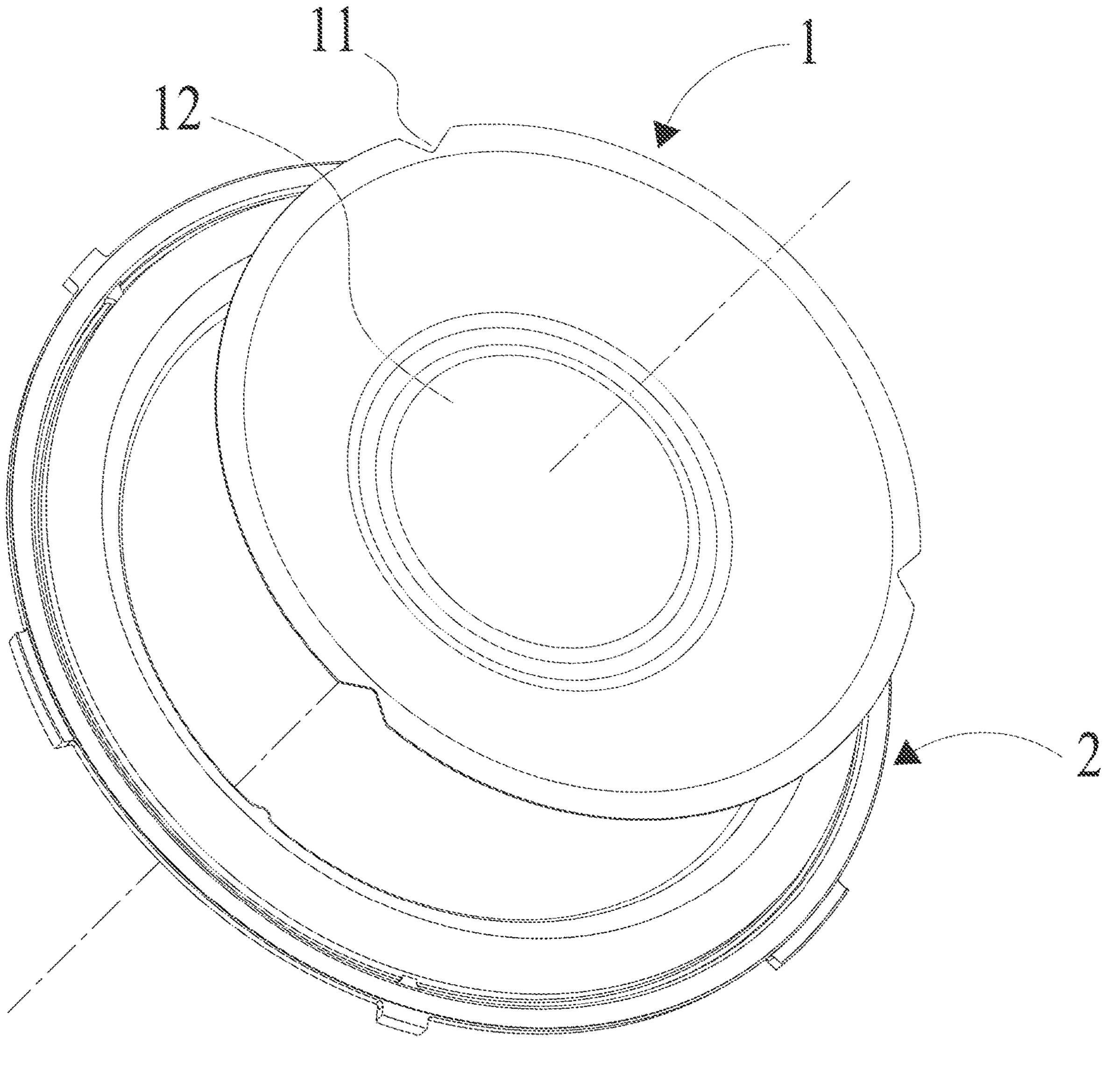
FIG. 1 is a exploded perspective view of the diaphragm assembly in accordance with the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

In order to solve the problems that may occur when miniaturizing component sizes, this application provides a method for manufacturing a diaphragm component and an injection molding mold, which are now described in detail through the following embodiments and in conjunction with the accompanying drawings. Reference in this application to "an embodiment" means that a particular feature, structure or characteristic described in connection with the embodiment may be included in at least one embodiment of the application. The appearances of the phrase "embodiment" in various places in the specification are not necessarily all referring to the same embodiment, nor are separate or alternative embodiments mutually exclusive with other embodiments. It will be understood by those skilled in the art that the embodiments described herein may be combined with other embodiments.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

In the description of this disclosure, it should be noted that, unless otherwise clearly stated and limited, the terms "installation", "connection" and "engagement" should be understood in a broad meaning. For example, "connection" or "engagement" of a mechanical structure may refer to a physical connection. For example, the physical connection may be a fixed connection, such as a fixed connection through a fastener, such as a fixed connection through screws, bolts or other fasteners. The physical connection may also be a detachable connection, such as mutually engaging connection. The physical connection can also be an integral connection; for example, welding, bonding or integrally forming a connection.

Figure 2:
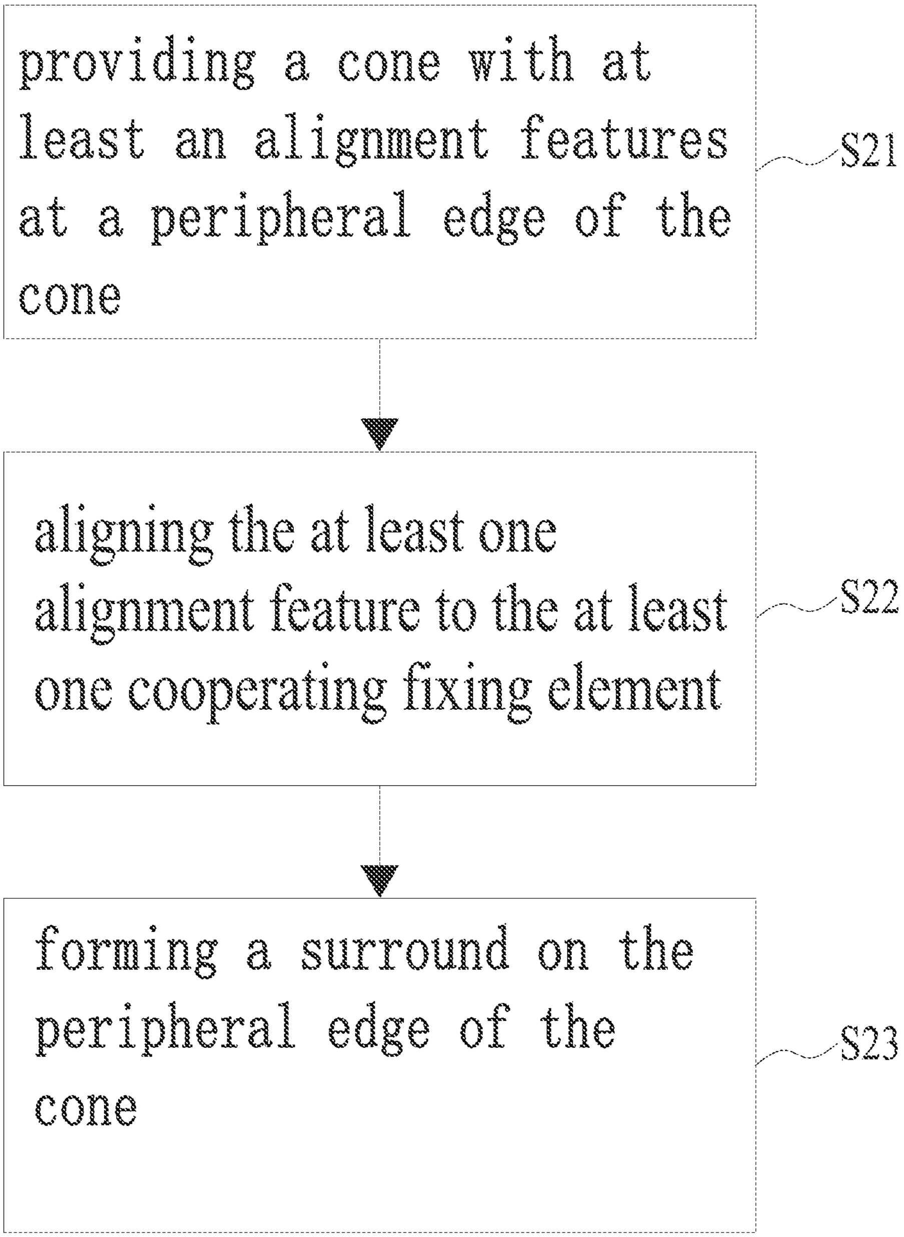
FIG. 2 is a flow chart showing a method of manufacturing the diaphragm assembly in accordance with the present disclosure.

Please refer to FIG. 1 and FIG. 2. FIG. 1 shows an exploded perspective view of the diaphragm assembly in accordance with the present disclosure. FIG. 2 is a flow chart showing a method of manufacturing the diaphragm assembly in accordance with the present disclosure.

According to this disclosure, the method of manufacturing diaphragm assembly may comprise step S21: providing a cone 1 with at least one alignment feature 11. The at least one alignment feature 11 is located at the peripheral edge of the cone 1. Preferably, the cone 1 can be formed by a thermoforming process or an injection molding process.

When the cone 1 is formed by the thermoforming process, it may also include a cropping step to form the alignment feature. For example, a sheet (such as a plastic sheet) is thermoformed (or hot-pressed) into the shape of the cone. The shape to be cut can be designed in advance at an appropriate location at the peripheral edge of the cone 1, then the cropping step is processed and cured, and the alignment feature 11 may be formed.

When the cone cone 1 is formed by the injection molding process, the alignment feature 11 can be formed at the same time as the injection or after the injection. For example, when designing the injection molding, the alignment feature 11 that forms at the peripheral edge of the cone 1 can be directly injected.

Preferably, the cone 1 is integrated with a dome. The cone 1 may also include a through hole without a closed dome. Where the cone 1 has no dome, the cone 1 may assemble with a dust cover or other parts. Furthermore, the cone 1 comprises a radiating surface, and it could be dome/cone or similar effect structure.

Figure 3A:
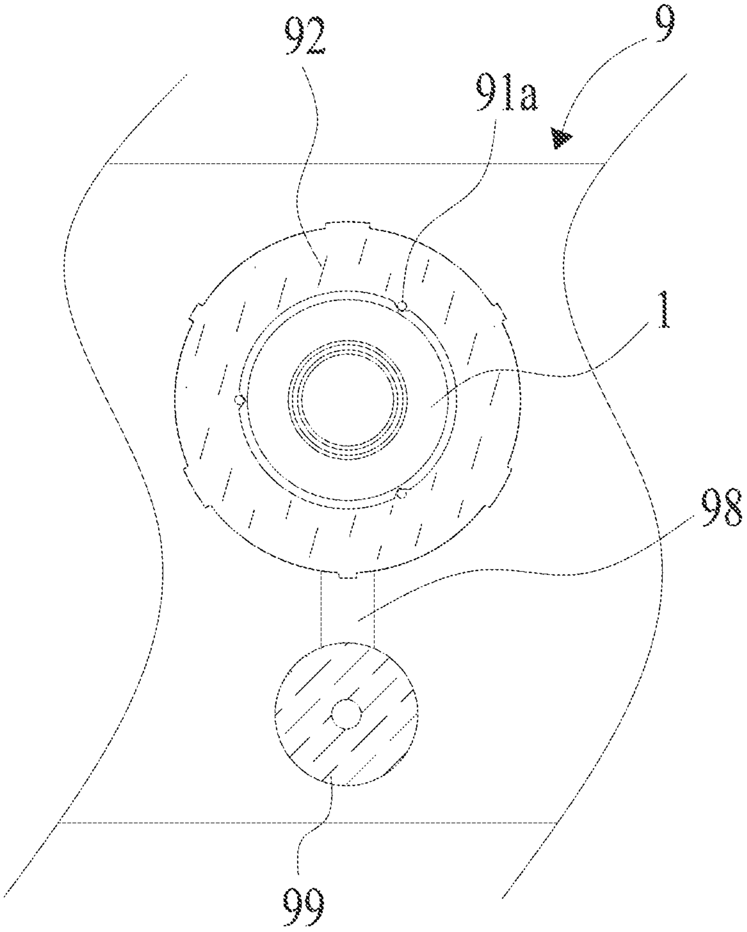
FIG. 3A is a top partial view of the injection mold according to one embodiment of this disclosure.
Figure 3B:
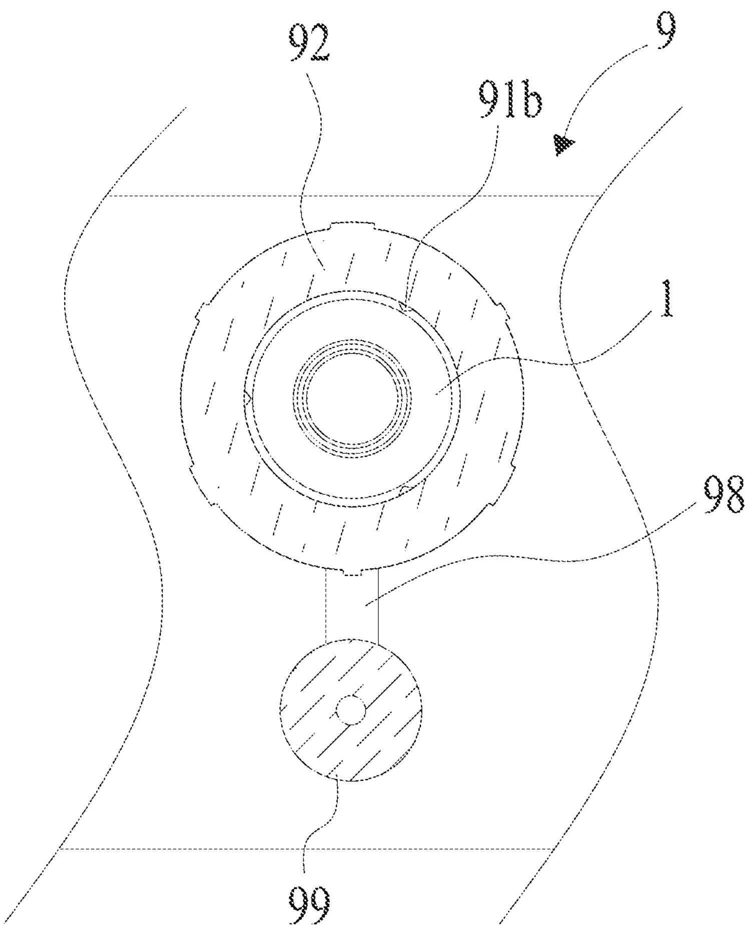
FIG. 3B is a top partial view of the injection mold according to another embodiment of this disclosure.

Next is step S22: aligning the at least one alignment feature 11 to the at least one cooperating fixing element (the cooperating fixing element 91*a* as shown in FIG. 3A, or the cooperating fixing element 91*b* as shown in FIG. 3B). The at least one cooperating fixing element 91*a* or 91*b* may be a part of a mounting tool. Preferably, the mounting tool is a part of an injection molding mold or a thermoforming mold. It will be appreciated that, in the context of the present invention, the mounting tool is not particularly limiting and is to be considered as any tool, device or apparatus on which the cone is mounted during subsequent formation of the surround on the cone. The mounting tool may be part of a moulding apparatus, for example.

In an embodiment, the alignment feature 11 is a notch. Preferably, the shape of the notch (the alignment feature 11) is approximately triangular, square, or circular.

Next is Step S23: forming a surround 2. The surround 2 surrounds the peripheral edge of the cone 1. Preferably, the surround 2 is formed by an overmoulding process. In other embodiments, the surround 2 may be formed by a liquid silicone rubber (LSR) injection process. Alternatively, in other embodiments, the surround 2 may be formed by a thermoforming process. Preferably, the material of cone 1 may be polycarbonate (PC) or other type/blend of structural plastic, thermoplastic elastomer, polyurethane, vulcanate, thermosetting or single/two-component silicone, glass fiber (GF) or any combination thereof. The material of surround 2 may be, such as, thermoplastic elastomer, thermosetting or single/two-component silicone or any combination thereof.

In a different embodiment, the cone 1 can be made of glass fiber or polycarbonate or the combination of them. Alternatively, we may use various materials to make the cone 1, e.g. woven fibre or amorphous fibre or other sheet material or plastic with suitable blend or TPU. The surround 2 can be made of thermoplastic urethane or elastomer or vulcanate (do not limit it to TPU, and it can be TPE or TPV or other plastic compound).

In a different embodiment, there are three alignment features 11, and there are three cooperating fixing elements 91*a* (or 91*b*) correspondingly. The three alignment features 11 correspond to the three cooperating fixing elements 91*a* (or 91*b*) respectively. The cooperating fixing element may be a triangular bar (as reference 91*b*), a square bar (not shown in the figures), or a circular bar (as reference 91*a*). Although the figures show that the three cooperating fixing elements are all the same shape, which is not used to limit the application. The cooperating fixing element may be changed according to different needs. For example, one of the cooperating fixing elements is a triangular bar, one is a cylinder, and the other one is a square bar. Correspondingly, the alignment features (i.e. the notch) of the cone 1 may be shaped in triangle, circle, or square. In addition, the quantity of alignment feature 11 and cooperating fixing element may also be changed according to needs, and is not limited to the above three mentioned shapes.

Figure 4:
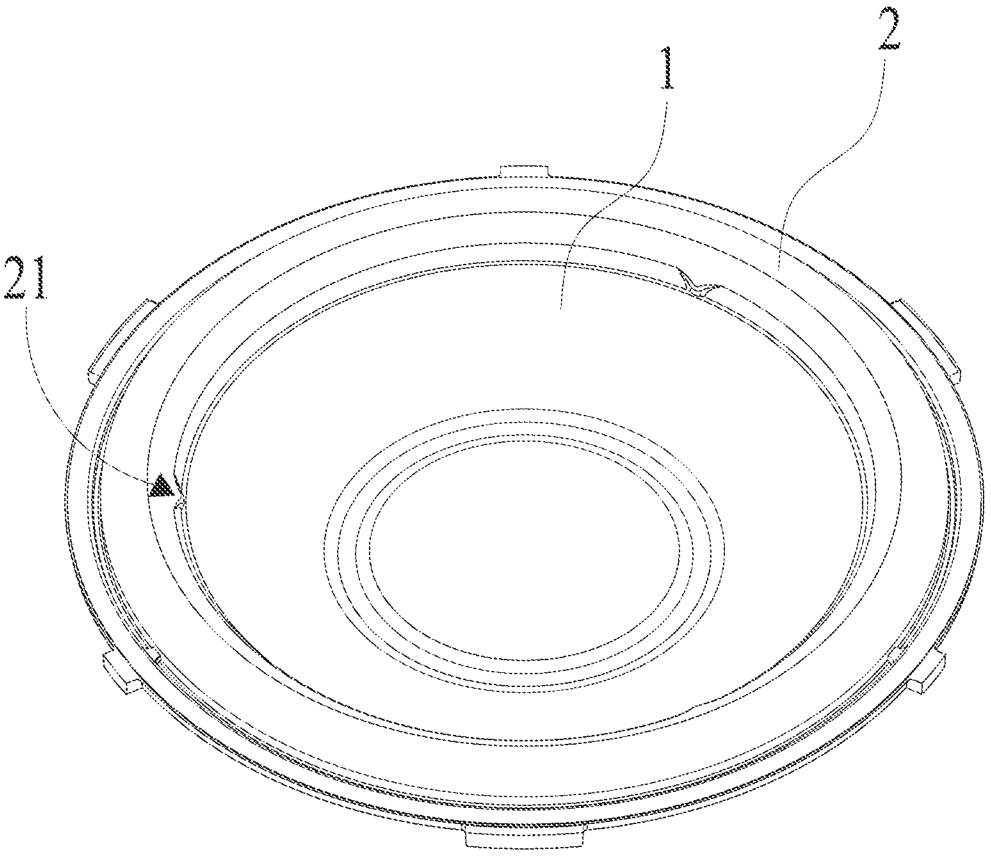
FIG. 4 is a perspective view of the diaphragm assembly in accordance with the present disclosure.

In another aspect, the present disclosure provides an injection molding mold. Please refer to FIG. 3A and FIG. 3B, which respectively show partial schematic views of an injection mold for two different embodiments. The difference between the two Figs. is in the shapes of the cooperating fixing elements 91*a* and 91*b*. An injection mold 9 includes an injection chamber 92 and at least one cooperating fixing element 91*a* or 91*b* located in the injection chamber 92. The alignment features 11 of cone 1 are placed in alignment with the cooperating fixing elements 91*a* or 91*b*. After the cone 1 is aligned by the cooperating fixing elements 91*a* or 91*b*, the cone 1 is located in the middle center of the injection chamber 92, and the cone 1 is coaxial with the injection chamber 92. Then the injection material fills the injection chamber 92. Once cured, the surround 2 is formed and surrounds the peripheral edge of the cone 1 (as shown in FIG. 4), forming as an integrated diaphragm assembly. Preferably, the surround 2 is formed by an overmoulding process. In other embodiments, the surround 2 may be formed by a liquid silicone rubber (LSR) injection process.

Specifically, the injection mold 9 uses a pump 99 to drive the injection material into the injection chamber 92, and the injection material flows into the injection chamber 92 through the channel 98 and fills full of the injection chamber 92. Although the illustrated injection mold 9 has only one set of pumps 99 and injection chambers 92, in practice, the injection mold 9 can be designed with multiple sets of pumps 99 and injection chambers 92 for mass production.

As mentioned above, the cooperating fixing element(s) can be a triangular bar, a square bar, or a circular bar. Correspondingly, cone 1 has alignment feature(s) 11 of a corresponding shape, so that cone 1 can be aligned in the center position through the cooperating fixing element 91*a* or 91*b*. That is, the cone 1 is coaxial with the injection chamber 92, positioned in the center. This ensures the center position of the diaphragm assembly, thus good sound production can be maintained no matter how small the size is.

Please refer to FIGS. 1 and 4. This disclosure provides a diaphragm assembly including a cone 1 and a surround 2. The cone 1 includes at least one alignment feature 11. The alignment feature 1 is located at the peripheral edge of the cone 1 and is configured to align with a cooperating fixing element (91*a* shown in FIG. 3A or 91*b* shown in FIG. 3B) in a mounting tool (such as in an injection mold).

Preferably, please refer to FIG. 4, the surround 2 includes at least one protruding portion 21, and the at least one protruding portion 21 is configured to correspond to at least one alignment feature 11. The protrusions 21 may reinforce the structure of the surround 2 in the vicinity of at least one alignment feature 11.

Preferably and similarly, the at least one alignment feature 11 is a notch. The notch (the alignment feature 11) is about triangular, square, or circular.

Figure 5A:
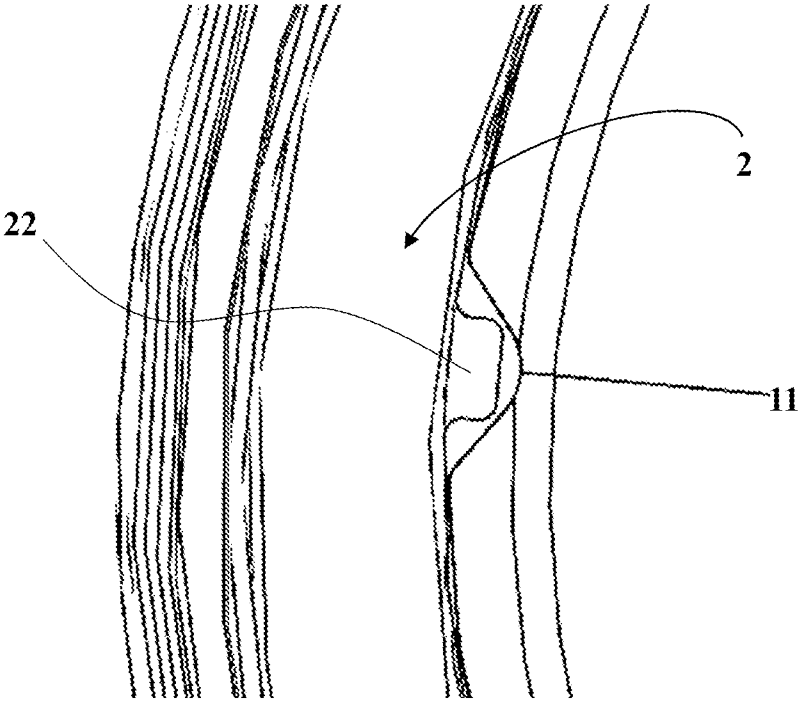
FIGS. 5A-5B are partial perspective views of the diaphragm assembly in accordance with yet another embodiment of the present disclosure.
Figure 5B:
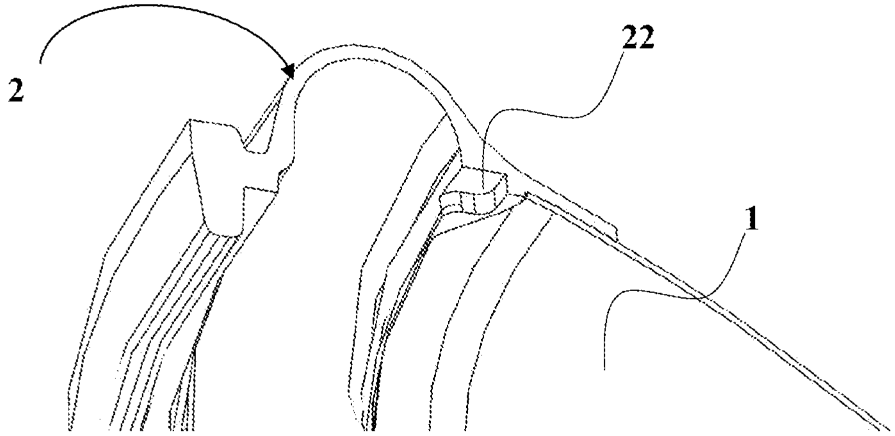

Please refer to FIG. 5A and FIG. 5B. When the surround 2 is formed by injection molding, due to the cooperating fixing element(s) 91*a* or 91*b* in the injection chamber 92, the surround 2 may be formed with at least one recessed portion 22 at the corresponding location of the cooperating fixing element(s) 91*a* or 91*b* after demolding. The shape of the recessed portion 22 corresponds to the shape of the cooperating fixing element 91*a* or 91*b*. In other words, the cone 1 is aligned with the cooperating fixing element(s), and the injection molded surround 2 will form a recessed portion(s) 22 due to the cooperating fixing element(s). Therefore, once cured, the surround 2 is formed and integrated with the cone 1 as one component, each recessed portion 22 will be located within each alignment feature 11, that is, the recessed portion 22 is surrounded by the alignment feature 11.

Figure 6A:
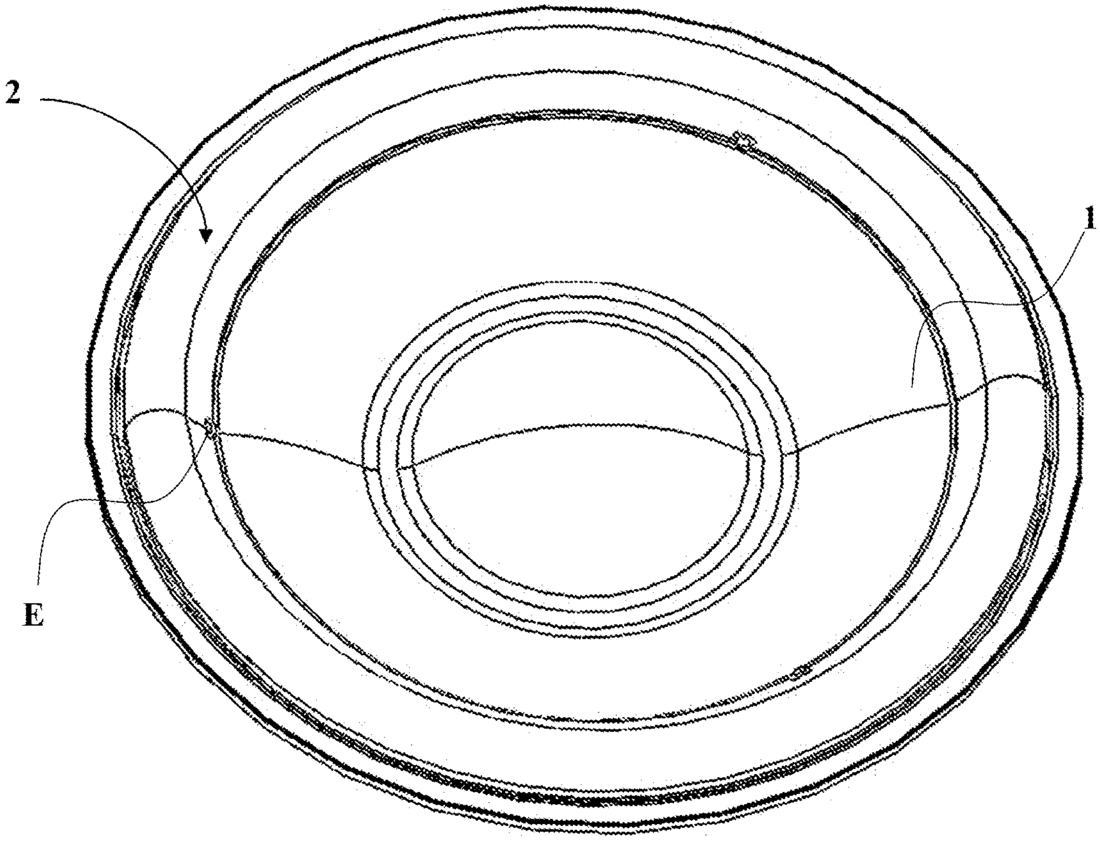
Figure 6B:
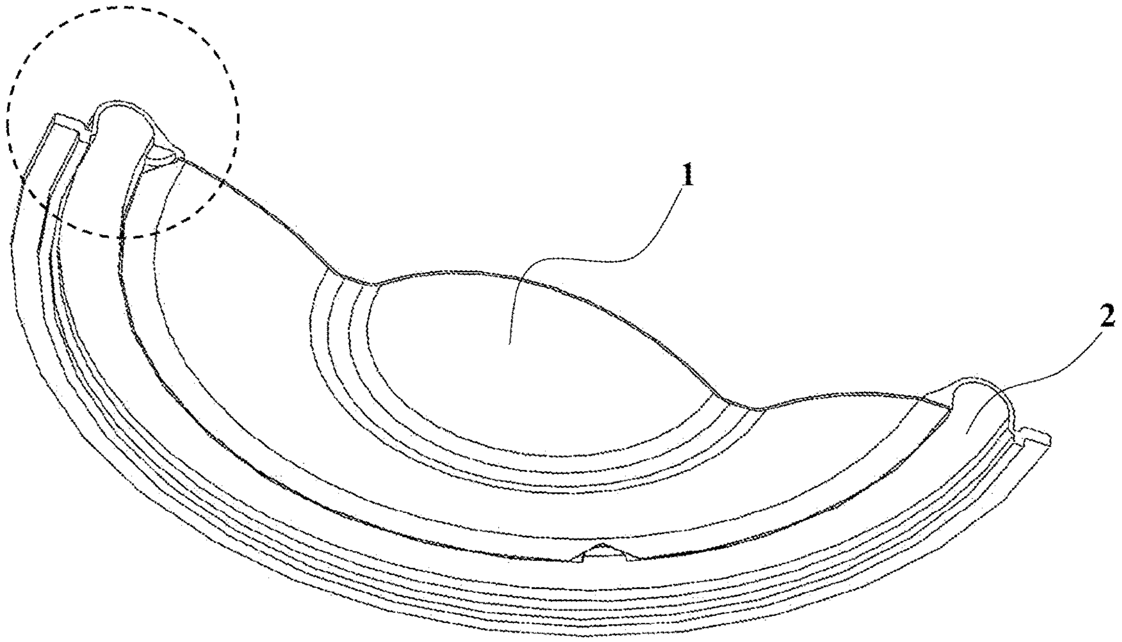
Figure 6C:
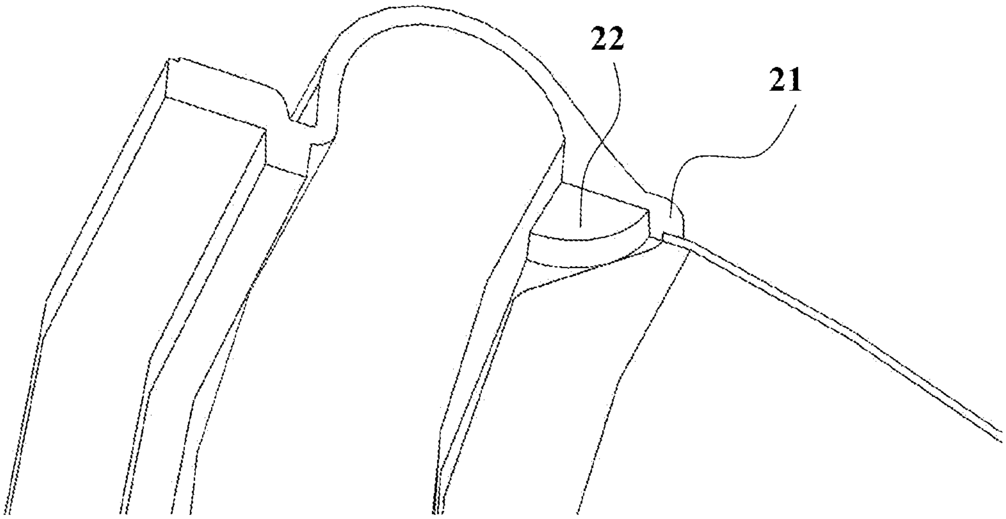
Figure 6D:
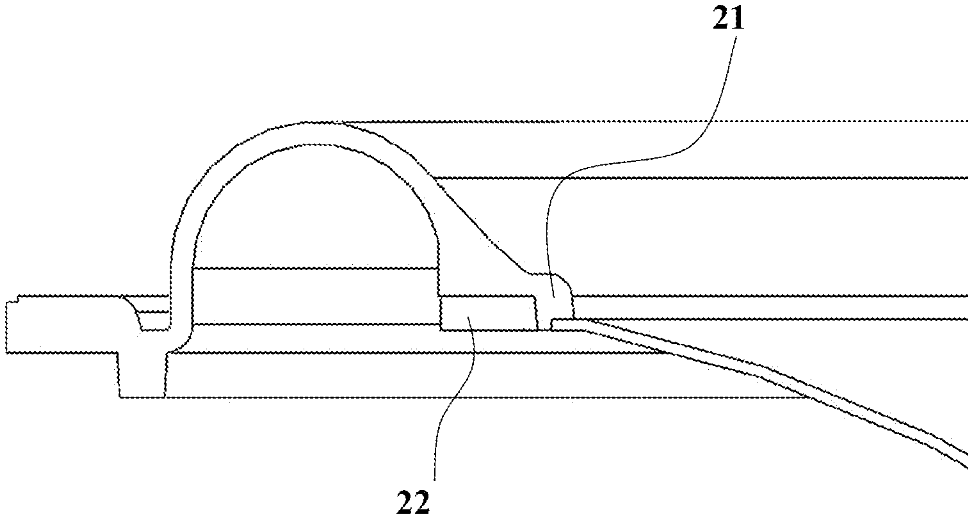

Please refer to FIGS. 6A to 6D. The diaphragm assembly includes a cone 1 and a surround 2. The cone 1 has at least one alignment feature 11, and the outer surface of the cone 1 faces upward. When the surround 2 is formed by injection molding, due to the at least one cooperating fixing element 91*a* or 91*b* in the injection chamber 92, at the corresponding position of the cooperating fixing element 91*a* or 91*b* (ie. the connection point E between cone 1 and surround 2), the inner surface of surround 2 will form a recessed portion 22. Please refer to FIG. 6B, which is a different perspective from FIG. 6A, where FIG. 6A shows the outer surface of surround 2, and FIG. 6B shows the cross section of the inner surface of surround 2 at E connection point. FIG. 6C is a partial enlarged view of FIG. 6B, and FIG. 6D is a front view of FIG. 6C.

Preferably, the surround 2 can be designed to include at least one protruding portion 21 to reinforce the structure, and the at least one protruding portion 21 can be disposed to correspond to the top of at least one alignment feature 11, that is, the top of the outer surface of the cone 1.

Figure 7A:
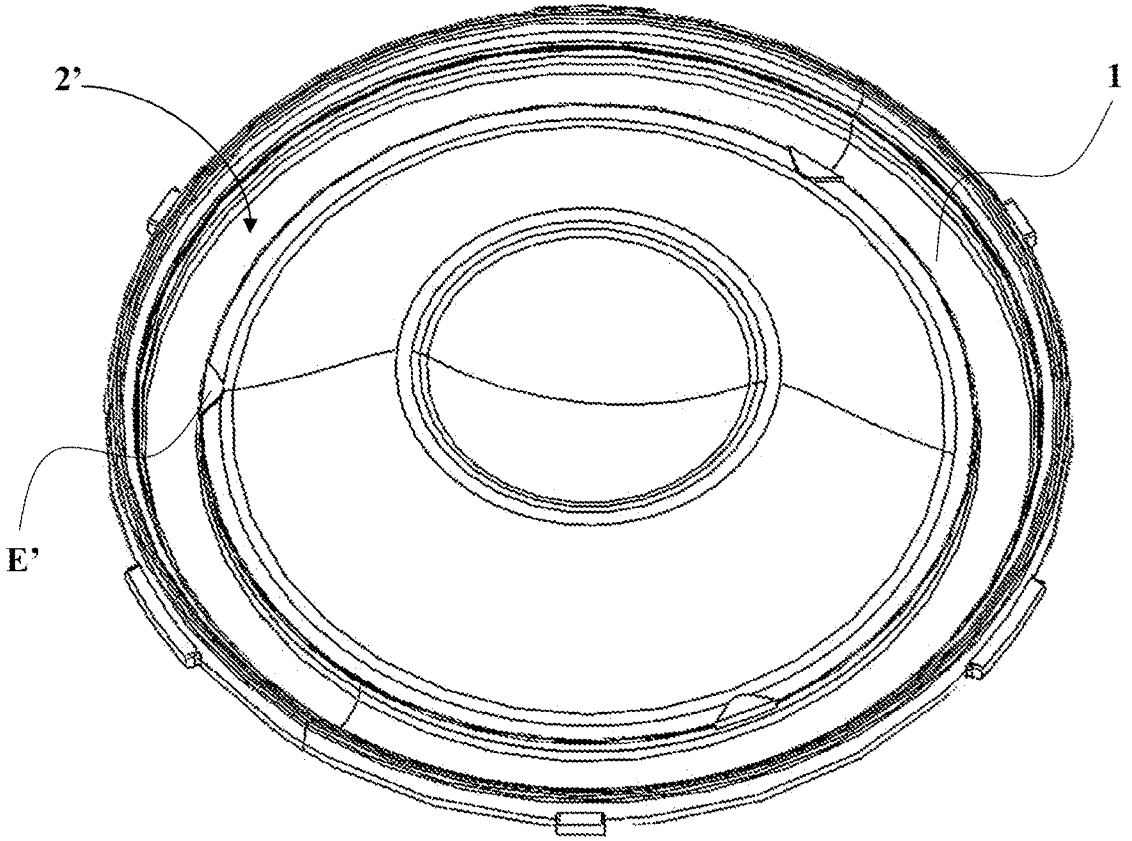
Figure 7B:
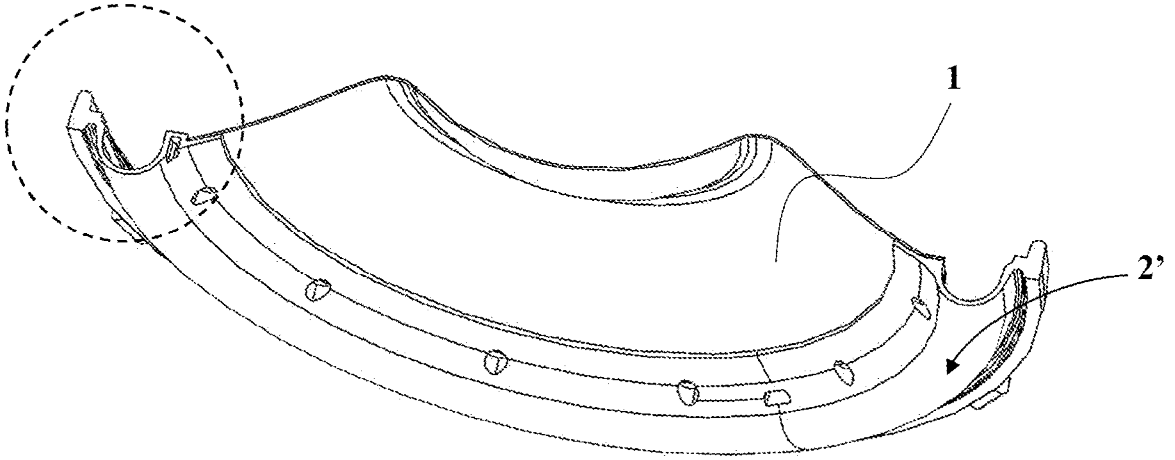
Figure 7C:
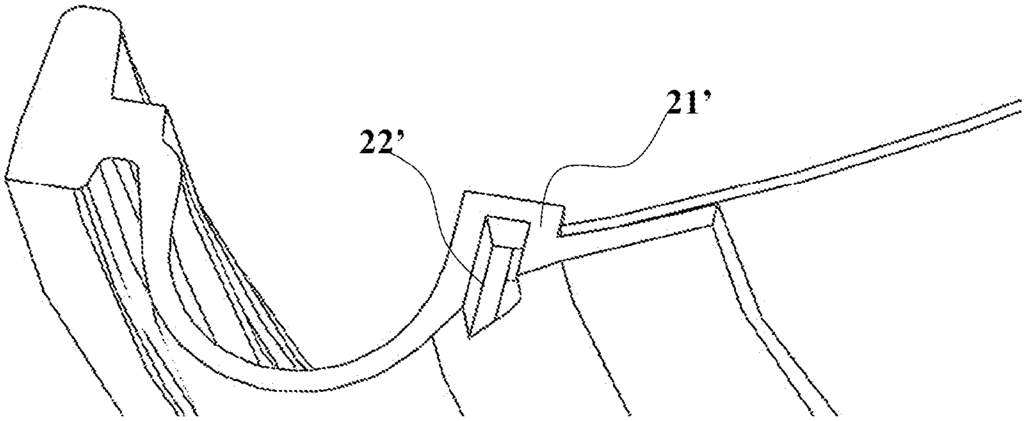
Figure 7D:
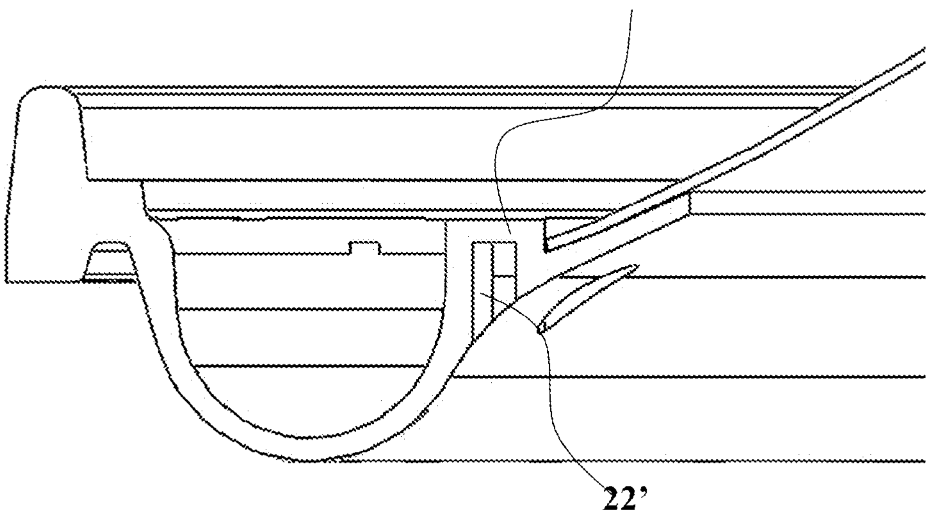

Please refer to FIGS. 7A to 7D. This disclosure provides another embodiment of a diaphragm assembly, which includes a cone 1 and a surround 2'. The cone 1 also has at least one alignment feature 11. In this embodiment, the surround 2' is formed by injection molding with the outer surface of cone 1 facing downward. Similar to the previous embodiments, since the at least one cooperating fixing element 91*a* or 91*b* is located in the injection chamber 92, when the surround 2' is formed by injection molding, at the corresponding position of the cooperating fixing element 91*a* or 91*b* (that is, the connection E between cone 1 and surround 2'), the outer surface of surround 2' will form a recessed portion 22'. Please refer to FIG. 7B (a different perspective from FIG. 7A, where FIG. 7A shows the inner surface of surround 2, and FIG. 7B shows cross-section view of the outer surface of surround 2 at E'). FIG. 7C is a partial enlarged view of FIG. 7B, and FIG. 7D is a front view of FIG. 7C.

Preferably, the surround 2' can be designed to include at least one protruding portion 21' to reinforce the structure, and the at least one protruding portion 21' can be disposed to correspond to the bottom of at least one alignment feature 11, that is, above the inner surface of cone 1.

Figure 8:
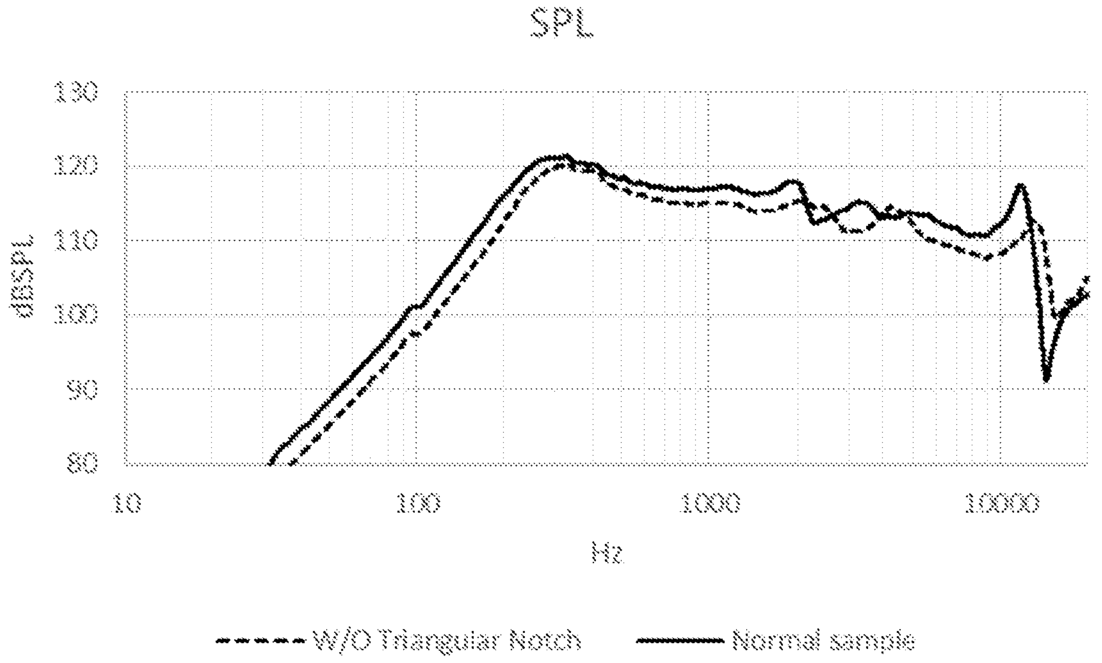
FIG. 8 is a graph of sound pressure level (SPL) against frequency for a speaker diaphragm with no alignment features and for a speaker diaphragm in accordance with an embodiment of the present invention with alignment features (ie. three cut-outs equally spaced along its peripheral edge).

Please refer to the sound pressure level (SPL) simulation diagram shown in FIG. 8. SPL is measured in decibels (dB), with the higher value, the louder the sound. The simulation diagram shows the test that the cone with alignment feature is a solid line, and the cone without alignment feature is shown as a dashed line. Obviously, in the high frequency range between 6 kHz and 12 kHz, for the cone without alignment feature (dashed line), the SPL drops sharply due to the speaker "break-up", which occurs at high frequencies within a "break-up" frequency region that differs from speaker to speaker. In the region non-linear vibrations are induced in the diaphragm assembly, resulting in a decrease in audio quality. This is a known and common problem with existing speakers. Compared with the design according to this disclosure, the test, showing in solid line, of the cone with alignment feature is relatively stable in the high frequency range between 6 kHz and 12 kHz. Furthermore, the advantage of a cone with alignment feature may be high frequency output maintained e.g. above 10 KHz or even higher in frequency. When the cone design includes the alignment feature, the test shows that under the same conditions, the SPL extension of 10K is 3 dB higher. This result is because the cone without the alignment feature has higher ineffective vibration resulting from higher anti-phase or quadrature components of the radiating surfaces.

The diaphragm assembly provided in this disclosure may be accurately aligned during the assembly process, which can greatly improve the yield rate, thereby reducing the waste materials. If the surround is formed by injection molding or similar process that can form the bond in process then the use of glue may be avoided, so it can comply with the concepts of green environmental protection and sustainable management.

A number of implementations have been described. Nevertheless, it will be understood that additional modifications may be made without departing from the scope of the inventive concepts described herein. Although this disclosure has been described in considerable detail with reference to certain embodiments thereof, the invention may be variously embodied without departing from the spirit or scope of the invention. Therefore, the following claims should not be limited to the description of the embodiments contained herein in any way.

What is claimed is:

1. A method of manufacturing diaphragm assembly, comprising:

providing a cone with at least one alignment feature at a peripheral edge thereof;

providing a mounting tool comprising at least one cooperating fixing element, wherein the at least one alignment feature is aligned with the at least one cooperating fixing element respectively such that the cone is centered within an injection chamber;

forming a surround at the peripheral edge of the cone by an injection molding process, wherein the at least one cooperating fixing element not only positions the cone during molding but also causes the surround, after molding, to include a recessed portion formed by the shape of the at least cooperating fixing element and located within the alignment feature, such that the recessed portion is structurally surrounded by the cone within the alignment feature, and the recessed portion and the surround are integrally formed from the same material through the injection molding process.

2. The method according to claim 1, wherein the cone comprises a radiating surface.

3. The method according to claim 1, wherein the at least one alignment feature is at least one notch.

4. The method according to claim 3, wherein the at least one notch is approximately in the shape of triangular, square, or circular.

5. The method according to claim 1, wherein there are three alignment features and three cooperating fixing elements, and the three alignment features and the three cooperating fixing elements are located correspondingly.

6. The method according to claim 1, wherein the cone is formed by a thermoforming process or an injection molding process.

7. The method according to claim 6, wherein when the cone is formed by the thermoforming process, the method further comprises a cropping process to form the at least one alignment feature.

8. The method according to claim 6, wherein when the cone is formed by the injection molding process, the at least one alignment feature is formed at the same time as the injection or after the injection.

9. The method according to claim 1, wherein the mounting tool is a part of an injection molding mold, and the surround is formed by an overmoulding process.

10. The method according to claim 1, wherein the mounting tool is a part of an injection molding mold, and the surround is formed by a liquid silicone rubber (LSR) injection process.

11. The method according to claim 1, wherein the material of the cone is polycarbonate (PC), thermoplastic elastomer, thermosetting or single/two-component silicone, glass fiber (GF) or any combination thereof, and the material of surround is thermoplastic elastomer, polyurethane, vulcanate, thermosetting or single/two-component silicone or any combination thereof.

* * * * *